(12) United States Patent
LV

(10) Patent No.: US 8,009,632 B1
(45) Date of Patent: Aug. 30, 2011

(54) METHOD AND SYSTEM FOR USE IN A CONNECTED STATE HANDOFF OF AN ACCESS TERMINAL

(75) Inventor: Sha LV, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/106,645

(22) Filed: May 12, 2011

Related U.S. Application Data

(63) Continuation of application No. 12/240,287, filed on Apr. 8, 2009, which is a continuation of application No. PCT/CN2007/003040, filed on Oct. 25, 2007.

(30) Foreign Application Priority Data

Dec. 1, 2006 (CN) .......................... 2006 1 0161003

(51) Int. Cl.
*H04W 4/00* (2009.01)
*H04W 36/00* (2009.01)
(52) U.S. Cl. ........................................ 370/331; 455/436
(58) Field of Classification Search .................. 370/252, 370/310–350
See application file for complete search history.

(56) References Cited

U.S. PATENT DOCUMENTS

| | | | |
|---|---|---|---|
| 5,949,771 A | 9/1999 | Declerck et al. | |
| 2003/0224786 A1* | 12/2003 | Lee et al. ................... | 455/432.1 |
| 2004/0208160 A1* | 10/2004 | Petrovic et al. ............... | 370/350 |
| 2007/0133470 A1* | 6/2007 | Cha et al. ...................... | 370/331 |
| 2008/0170548 A1* | 7/2008 | Suh et al. ...................... | 370/331 |
| 2008/0310345 A1* | 12/2008 | Chun et al. .................... | 370/328 |
| 2010/0152485 A1* | 6/2010 | Holtzapple et al. ........... | 562/400 |
| 2010/0202404 A1* | 8/2010 | Yi et al. ........................ | 370/331 |
| 2010/0215020 A1* | 8/2010 | Lee et al. ...................... | 370/331 |
| 2011/0019609 A1* | 1/2011 | Zhong et al. .................. | 370/315 |

FOREIGN PATENT DOCUMENTS

WO  WO 2006/118540 A2  11/2006

OTHER PUBLICATIONS

3GPP2 A.S0008-C v1.0, Interoperability Specification (IOS) for High Rate Packet Data (HRPD) Radio Access Network Interfaces with Session Control in the Access Network. Jul. 2007. http://www.3gpp2.org/public_html/specs/A.S0008-C_v1.0_070801.pdf.*

* cited by examiner

*Primary Examiner* — Warner Wong
(74) *Attorney, Agent, or Firm* — Leydig, Voit & Mayer, Ltd.

(57) ABSTRACT

A method of sending reset message sequence number is provided. During a connected state handoff of an access terminal (AT) between a source access network (AN) and a target AN, the source AN sends a reset message sequence number of the AT to the target AN. The source AN adds the reset message sequence number of the AT to the message sent to the target AN. Thereby, the problem in the existing systems that the source AN cannot send the reset message sequence number of the AT to the target AN and, thus, the target AN cannot perform a reset process on the AT when the AT is switched from the source AN to the target AN, is solved. An access network (AN) and a communication system are also provided.

9 Claims, 3 Drawing Sheets

METHOD AND SYSTEM FOR USE IN A CONNECTED STATE HANDOFF OF AN ACCESS TERMINAL

CROSS-REFERENCE TO RELATED APPLICATIONS

This application is a continuation of U.S. patent application Ser. No. 12/420,287, filed on Apr. 8, 2009, which is a continuation of International Application No. PCT/CN2007/003040, filed on Oct. 25, 2007. The International Application claims priority to Chinese Patent Application No. 200610161003.9, filed on Dec. 1, 2006. The aforementioned patent applications are hereby incorporated by reference in their entireties.

FIELD OF THE INVENTION

The present invention relates to the communication field, and more particularly, to a method, device, and system for sending a reset message sequence number.

BACKGROUND

In a code division multiple access high rate packet data (CDMA HRPD) system, signals are transmitted by using a signaling link protocol (SLP), and information interaction between an access network (AN) and an access terminal (AT) is realized by sending SLP message packets between the AN and the AT. Each SLP packet has a corresponding sequence number. The sequence number beginning from 0 is used for determining whether the SLP packet is a retransmitted message. When a reset process of SLP needs to be performed for the AT, the reset process of the SLP is accomplished by sending a Reset message and a ResetAck message between the AN and the AT. The Reset message and the ResetAck message also have the corresponding message sequence numbers, and the message sequence numbers of the Reset message and the ResetAck message in the same flow are identical.

As shown in FIG. 1, the main flow of the reset process of SLP is given below.

In Step 100, an AN initializes the local sequence number of the SLP packet for the AT (including sending message sequence number and receiving message sequence number).

In Step 101, the AN sends a Reset message to the AT.

In Step 102, the AT receives the Reset message, and then verifies the message sequence number of the Reset message.

In Step 103, when determining that the Reset message is valid, the AT feeds back a ResetAck message to the AN.

On the other hand, when determining that the Reset message is invalid, the AT discards the Reset message.

In Step 104, the AT initializes the local sequence number of the SLP packet.

In Step 105, the AN receives the ResetAck message, and verifies the message sequence number of the ResetAck message. For example, if the message sequence number of the ResetAck message is identical to the message sequence number of the Reset message delivered by the AN, the ResetAck message is considered to be valid.

In the above method, the valid check on the Reset message is performed by verifying the message sequence number of the Reset message, and the verification method is described below. Given that the sequence number occupies S bits, if the sequence number is N, $[N+1, N+2^{S-1}-1]$ is considered to be greater than N, and $[N-5S-1, N-1]$ is smaller than N. When the AT receives the Reset message, if the message sequence number carried in the Reset message is greater than the message sequence number of the Reset message previously received by the AT, the Reset message is considered valid; otherwise, the message is considered invalid.

In the conventional CDMA HRPD system, the AT verifies the validation of the Reset message according to the message sequence number of the Reset message. Thereby, during a connected state handoff between the ANs, since the source AN cannot transmit the message sequence number of the Reset message to the target AN, the target AN cannot perform a reset process on the AT. Therefore, the sequence number of the SLP packet subsequently sent between the AT and the target AN is determined to be invalid, thus causing packet loss.

For example, if the Reset message sequence number of the AT on the source AN is 2 and the Reset message sequence number on the AT is also 2, after the AT is switched from the source AN to the target AN, since the target AN fails to receive the Reset message sequence number of the AT, the Reset message sequence number of the AT on the target AN is 1. When the target AN performs a reset process on the AT, the Reset message sequence number "1" is sent to the AT, and AT determines that "1" is smaller than the local Reset message sequence number "2," so that a reset process will not be performed, that is, the local SLP data structure and the corresponding buffer will not be cleared and the sequence number of the local SLP packet will not return to zero. After the source AN sends the Reset message sequence number "1," the local SLP data structure and the corresponding buffer of the AT and the sequence number of the SLP packet are initialized, so that the AT relevant information at two sides are inconsistent. When the target AN sends the SLP packet to the AT, since the sequence number of the SLP packet is smaller than the sequence number of the local SLP packet of the AT, the AT determines that the SLP packet subsequently sent by the target AN is invalid and then discards the SLP packet, thus causing SLP packet loss. Such a packet loss will trigger failures to receive calls from other ATs or to use subscribed application services, thereby causing inconveniences to subscribers.

SUMMARY

The present invention provides a method of sending Reset message sequence number, a communication device, and a communication system.

The present invention provides a method of sending reset message sequence number, which includes the following step.

During a connected state handoff of an access terminal (AT) between a source access network (AN) and a target AN, the source AN sends a reset message sequence number of the AT to the target AN.

The present invention provides a communication device, which includes the following units.

A unit is adapted to confirm a connected state handoff of an access terminal (AT) to a target access network (AN).

A unit is adapted to send a reset message sequence number of the AT to the target AN during the connected state handoff of the AT.

The present invention provides a communication system, which includes a plurality of access networks (ANs).

The AT is adapted to establish a connection with a corresponding AN, so as to accomplish data communication.

The plurality of ANs is adapted to enable the AT to access the network. When a connection state of the AT is switched between a source AN and a target AN, the source AN sends the reset message sequence number of the AT to the target AN, and the target AN performs a reset process on the AT according to the message sequence number.

The present invention has the following advantages.

In the present invention, a reset message sequence number of an AT is added into a message sent by the source AN to the target AN, thereby, during a switch of the AT from the source AN to the target AN, the reset message sequence number corresponding to the AT in the target AN can be updated in real time, so as to ensure the normal data communication after the AT is switched to the target AN, avoid signaling link protocol (LSP) data packet loss during the communication, thus ensuring the service quality of the AN.

DETAILED DESCRIPTION

In an embodiment, during a connected state handoff of an access terminal (AT) between a source access network (AN) and a target AN, the source AN transmits a Reset message sequence number to the target AN, and the target AN performs a reset process for the AT according to the Reset message sequence number.

The source AN may transfer the Reset message sequence number to the target AN in many different ways. For example, when sending an A16-session Transfer Request Message to the target AN, the source AN adds the Reset message sequence number of the AT into the A16-session Transfer Request message. Or, when sending an A16-session Transfer Complete Message to the target AN, the source AN adds the Reset message sequence number of the AT into the A16-session Transfer Complete Message. Certainly, a new message may also be used to transmit the Reset message sequence number of the AT.

The A16-session Transfer Request Message or the A16-session Transfer Complete Message may carry the Reset message sequence number during the transmission in many different ways. For example, a session state information (SSI) is added into an Information Element of the message to carry the Reset message sequence number of the AT. Or, a new Information Element is added into the A16-session Transfer Request Message or the A16-session Transfer Complete Message to carry the Reset message sequence number of the AT.

Hereinafter the way of using the A16-session Transfer Request Message and the A16-session Transfer Complete Message to transmit the Reset message sequence number is illustrated as an example with reference to the accompanied drawings.

Figure 1:
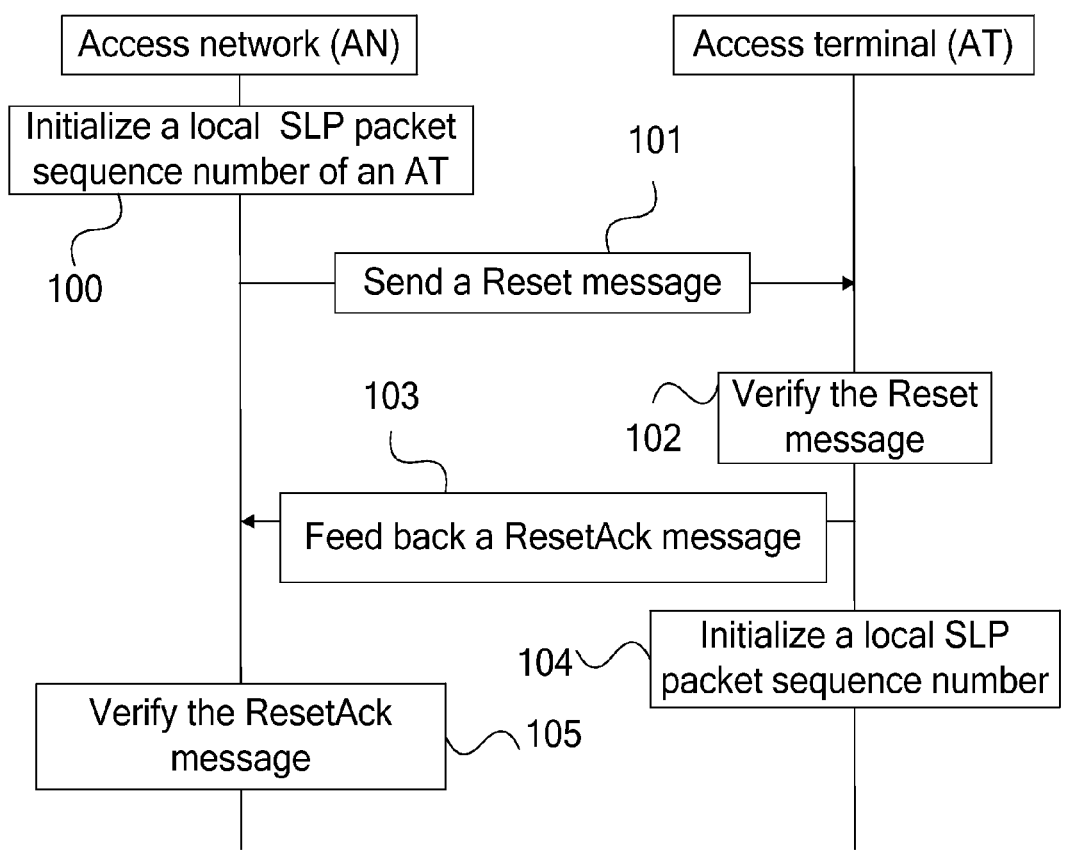
FIG. 1 is a flow chart of the reset process of SLP.
Figure 2A:
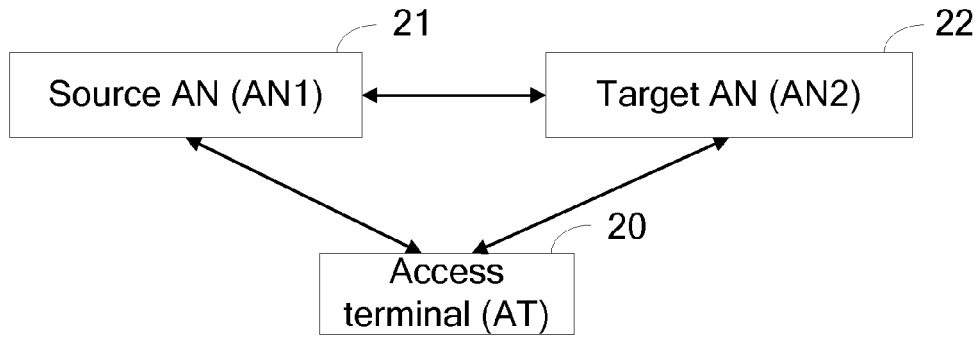
FIG. 2A is a systematic structural view of a communication system, according to an embodiment of the present invention.

As shown in FIG. 2A, in this embodiment, the communication system includes an access terminal 20 (AT), a source access network 21 (AN1), and a target access network 22 (AN2). The AT 20 is adapted to establish a connection with the corresponding AN, so as to accomplish data communication. The source AN 21 is adapted to send the Reset message sequence number of the AT 20 to the target AN 22 during a switch of the AT 20 from the source AN 21 to the target AN 22; the target AN 22 is adapted to perform a reset process for the AT 20 according to the Reset message sequence number sent by the source AN 21.

Figure 2B:
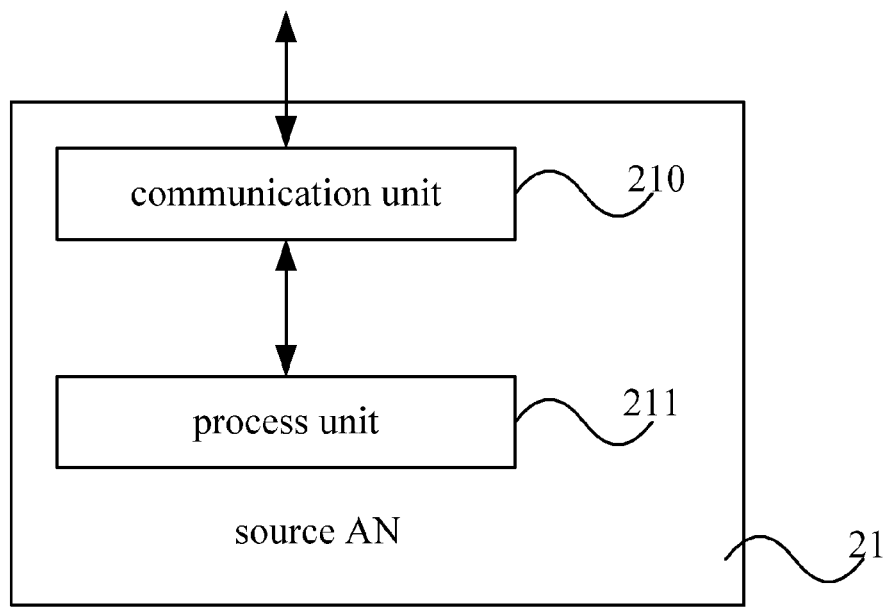
FIG. 2B is a functional structural view of a source AN, according to an embodiment in the present invention.

As shown in FIG. 2B, in this embodiment, the source AN 21 includes a communication unit 210 and a processing unit 211. The communication unit 210 is adapted to send the Reset message sequence number of the AT 20 to the target AN 22 during the connected state handoff of the AT 20. The processing unit 211 is adapted to confirm the connected state handoff of the AT 20 to the target AN 22, and add the Reset message sequence number into the message sent to the target AN 22.

In this embodiment, each message sent during information interaction between the AN1 and the AN2 is composed of a plurality of different Information Elements, and each Information Element contains a corresponding SSI information or/and configuration negotiation parameter. Therefore, the AN1 may add the Reset message sequence number of the AT into the message sent to the AN2 by two methods.

In the first method, a new SSI information, i.e., a Reset Parameter SSI, is added into a SSI record Information Element of the A16-session Transfer Request Message and the A16-session Transfer Complete Message, and the Reset Parameter SSI contains the Reset message sequence number of the AT.

As shown in Table 1, the Reset Parameter SSI information includes fields and lengths. The fields include Parameter Type, Length, and Reset Sequence number of the source AN 21. The Reset Parameter SSI information is filled in the SSI record Information Element in the manner given in Table 2.

TABLE 1

| Field | Length (bits) |
| --- | --- |
| Parameter Type | 8 |
| Length | 8 |
| Reset Sequence number | 8 |

TABLE 2

| Field | Length (bits) | Reset Parameter |
| --- | --- | --- |
| Format ID | 8 | 0 |
| Reserved ID | 1 | 0 |
| Protocol Type | 7 | 0x14 |
| Protocol Subtype | 16 | 0 |
| Parameter Type | 8 | 1 |
| Length | 8 | 1 |
| Reset Sequence number | 8 | 8 |

During a connected state handoff of the AT between the AN1 and the AN2, the AN1 and the AN2 perform a session information transfer through an A16 interface, and the Reset Parameter SSI information is transferred from the AN1 to the AN2 through the A16 interface.

Figure 3:
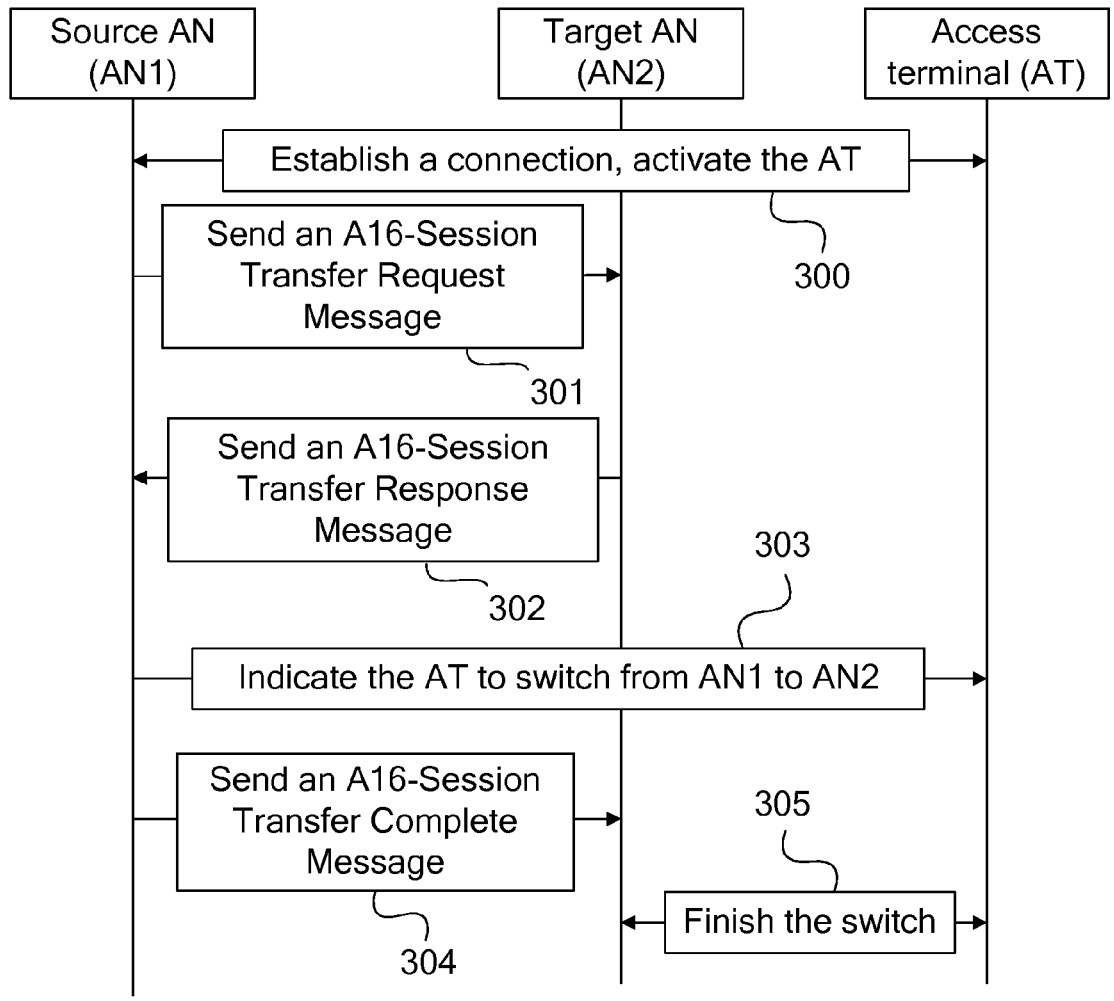
FIG. 3 is a flow chart of a connected state handoff of an AT between a source AN and a target AN, according to an embodiment in the present invention.

As shown in FIG. 3, the detailed flow of the connected state handoff of the AT 20 between the source AN 21 and the target AN 22 is described below.

In Step 300, a connection is established between the AT and the AN1, so as to activate the AT.

In Step 301, the AN1 sends an A16-Session Transfer Request Message to the AN2 for switching the AT to the AN2. The A16-Session Transfer Request Message contains a Reset Parameter SSI information.

In Step 302, the AN2 receives the A16-Session Transfer Request Message sent by the AN1, and feeds back an A16-Session Transfer Response message to the AN1.

In Step 303, the AN1 receives the A16-Session Transfer Response message, and then indicates the AT to switch from the AN1 to the AN2.

In Step 304, the AN1 sends an A16-Session Transfer Complete Message to the AN2 to inform the AN2 that the switch is performed.

Since the parameters may be changed during the switch, the A16-Session Transfer Complete Message also needs to carry the Reset Parameter SSI information.

In Step 305, the AT is switched from the AN1 to the AN2.

In the above first method, the Reset Parameter SSI information is added in the existing Information Element of the A16 interface between the AN1 and the AN2, thereby, the AN2 and the AT may maintain the new Reset Parameter SSI information at the same time, so as to enhance the reliability of the Reset message sequence number carried by the information.

In the second method, an Information Element, i.e., a Reset Parameters Information Element, is added into the A16-Session Transfer Complete Message sent from the AN1 to the AN2. The header information and field information contained in the Information Element are respectively shown in Table 3 and Table 4; and the way of filling the Information Element in the A16-Session Transfer Complete Message is shown in Table 5.

TABLE 3

| Information Element Name | Identifier (Hex) |
| --- | --- |
| Reset Parameters | 17H |

TABLE 4

| ⇒Reset Parameters: | A16 Information Element Identifier = [17H] | 1 |
| --- | --- | --- |
| | Length = [01H] | 2 |
| | Last Reset Message Sequence number | 3 |

'1' illustrates the first byte, '2' illustrates the second byte, and '3' illustrates the third byte.

TABLE 5

| Information Element | Information Element Direction | Type | |
| --- | --- | --- | --- |
| A16 Message Type | Source → Target | M | |
| AT-ID | Source → Target | Oa | R |
| Session State Information Record | Source → Target | Ob | C |
| Confirmed Unicast Access Terminal Identifier (UATI) | Source → Target | Oc | C |
| Assigned UATI | Source → Target | Od | C |
| Long Code Mask UATI (LCM_UATI) | Source → Target | Oc | C |
| Signaling Link Protocol - D Parameters (SLP-D Parameters) | Source → Target | Oe | C |
| Signaling Link Protocol - F Parameters (SLP-F Parameters) | Source → Target | Oe | C |
| Reset Parameters | Source → Target | O | C |

'M' illustrates that the corresponding Information Element is must; 'O' illustrates that the corresponding Information Element is optional; 'a,' 'b' . . . are tabs for remarking, which are illustrated in detail in 3GPP.

After the Reset Parameters Information Element is added into the A16-Session Transfer Complete Message, during the connected state handoff of the AT between the AN1 and the AN2, the AN merely adds the Reset message sequence number into the A16-Session Transfer Complete Message, thereby improving the transmission efficiency of the A16 interface. On the other hand, the Reset message sequence number is transmitted as an individual Information Element, so as to enhance the observability of the parameter.

By means of the above two methods, after the AT is accessed to the AN2, when a reset process needs to be performed for the AT, the AN2 sends the Reset message to the AT, and the message sequence number contained in the Reset message is the Reset Sequence number carried in the Reset Parameter SSI sent by the AN1 plus 1.

After the AT receives the Reset message delivered by the AN2, a validity check is performed on the Reset message firstly. When the AT determines the Reset message is a valid message, a ResetAck message is sent to the AN2, and the local SLP data structure, the corresponding buffer, and the sequence number of the SLP packet are initialized.

Obviously, persons skilled in the art may make various alternations and modifications on the present invention without departing from the scope or spirit of the invention. Thereby, the present invention tends to cover the alternations and modifications which fall within the scope of the claims of the present invention and the equivalent techniques.

What is claimed is:

1. A method for use in a connected state handoff of an access terminal (AT) between a source access network (AN) and a target AN, comprising:
   sending, by the source AN, an A16-Session Transfer Request Message to the target AN;
   receiving, by the source AN, an A16-Session Transfer Response Message from the target AN;
   sending, by the source AN, an A16-Session Transfer Complete Message to the target AN;
   wherein the A16-Session Transfer Complete Message carries a reset message sequence number of the AT.

2. The method according to claim 1, wherein an Information Element of the A16-Session Transfer Request Message comprises a session state information (SSI), and the SSI carries the reset message sequence number of the AT.

3. The method according to claim 1, wherein an Information Element of the A16-Session Transfer Complete Message comprises a session state information (SSI), and the SSI carries the reset message sequence number of the AT.

4. The method according to claim 1, wherein the A16-Session Transfer Complete Message comprises a new Information Element, and the Information Element carries the reset message sequence number of the AT.

5. The method according to claim 1, wherein the target AN updates the reset message sequence number by adding one (1) to the reset message sequence number, and performs a reset process on the AT according to the updated reset message sequence number.

6. A communication system for use in a connected state handoff of an access terminal (AT), comprising:
   a source AN, configured to send an A16-Session Transfer Request Message to a target AN; receive an A16-Session Transfer Response message from the target AN and send an A16-Session Transfer Complete Message to the target AN;
   the target AN, configured to receive the A16-Session Transfer Request Message from the source AN; send the A16-Session Transfer Response message to the source AN and receive the A16-Session Transfer Complete Message from the source AN;
   wherein the A16-Session Transfer Complete Message carries a reset message sequence number of the AT.

7. The communication system according to claim 6, wherein an Information Element of the A16-Session Transfer Complete Message comprises a session state information (SSI), and the SSI carries the reset message sequence number of the AT.

8. The communication system according to claim 6, wherein the A16-Session Transfer Complete Message comprises a new Information Element, and the Information Element carries the reset message sequence number of the AT.

9. The communication system according to claim 6, wherein the target AN is further configured to update the reset message sequence number by adding one (1) to the reset message sequence number, and then perform a reset process on the AT according to the updated reset message sequence number.

* * * * *

UNITED STATES PATENT AND TRADEMARK OFFICE
CERTIFICATE OF CORRECTION

| | | |
|---|---|---|
| PATENT NO. | : 8,009,632 B1 | |
| APPLICATION NO. | : 13/106645 | |
| DATED | : August 30, 2011 | |
| INVENTOR(S) | : Sha LV | |

It is certified that error appears in the above-identified patent and that said Letters Patent is hereby corrected as shown below:

Title page, section (63), "12/240,287" should read --12/420,287--.

Signed and Sealed this
Twenty-second Day of November, 2011

David J. Kappos
*Director of the United States Patent and Trademark Office*